United States Patent
Huelsen et al.

(10) Patent No.: US 11,851,106 B2
(45) Date of Patent: Dec. 26, 2023

(54) ROOF MODULE WITH SENSOR SYSTEM FOR A MOTOR VEHICLE WHICH TRAVELS AUTONOMOUSLY OR PARTIALLY AUTONOMOUSLY, COMPRISING A ROOF OPENING SYSTEM AND/OR A FIXED ROOF ELEMENT

(71) Applicant: Webasto SE, Stockdorf (DE)

(72) Inventors: Michael Huelsen, Stockdorf (DE); Johannes Thannheimer, Stockdorf (DE); Dirk Legler, Stockdorf (DE); Max Huber, Stockdorf (DE); Thomas Lindner, Stockdorf (DE); Michael Deppe, Stockdorf (DE); Thomas Rudolph, Stockdorf (DE); Cedric Langlais, Stockdorf (DE); Michael Mailhamer, Stockdorf (DE); Juraj Lehotsky, Stockdorf (DE); Achim Holzwarth, Stockdorf (DE); Michael Respondek, Stockdorf (DE); Alexander Kilias, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/433,449

(22) PCT Filed: Dec. 4, 2019

(86) PCT No.: PCT/EP2019/083672
§ 371 (c)(1),
(2) Date: Aug. 24, 2021

(87) PCT Pub. No.: WO2021/032312
PCT Pub. Date: Feb. 25, 2021

(65) Prior Publication Data
US 2022/0169314 A1 Jun. 2, 2022

(30) Foreign Application Priority Data

Aug. 19, 2019 (DE) ............ 10 2019 122 193.5

(51) Int. Cl.
*B62D 25/06* (2006.01)
*B60J 7/04* (2006.01)
(Continued)

(52) U.S. Cl.
CPC .............. *B62D 25/06* (2013.01); *B60J 7/04* (2013.01); *B62D 29/043* (2013.01);
(Continued)

(58) Field of Classification Search
CPC .............................. B60J 7/043; B60J 7/0435
(Continued)

(56) References Cited

U.S. PATENT DOCUMENTS 9,802,656 B1 10/2017 Williams et al.
2016/0297437 A1 10/2016 Hara et al.
(Continued)

FOREIGN PATENT DOCUMENTS

DE         10239863 B4 *  3/2005 ............ B60J 7/0435
DE     102005035427 A1    2/2007
(Continued)

OTHER PUBLICATIONS

Translation of International Search Report and Written Opinion for PCT/EP2019/083672 dated Mar. 3, 2022, in English (7 pages).
(Continued)

*Primary Examiner* — Dennis H Pedder
(74) *Attorney, Agent, or Firm* — Fitch, Even, Tabin & Flannery, LLP (57) ABSTRACT

A roof module for a motor vehicle may have a roof skin, a roof frame on a vehicle body and have at least one transverse frame part extending in the transverse roof direction and a
(Continued)

longitudinal frame part extending in the longitudinal roof direction on either side of a longitudinal center roof plane, and a roof opening system having a lid element configured to be displaced on guide rails, which are part of the longitudinal frame parts of the roof frame, in the longitudinal roof direction relative to the roof frame, and/or a solid roof element having a transparent see-through portion and being rigidly connected to the roof frame, having a sensor system comprising at least one sensor module which has at least one environmental sensor and is located outside of the roof opening and/or outside of the transparent see-through portions and is covered by a cover element.

17 Claims, 9 Drawing Sheets

(51) Int. Cl.
  *B62D 29/04* (2006.01)
  *G01S 13/931* (2020.01)
  *B60Q 1/50* (2006.01)
  *B60Q 5/00* (2006.01)
  *B60S 1/62* (2006.01)
  *H01Q 1/32* (2006.01)

(52) U.S. Cl.
  CPC .............. *G01S 13/931* (2013.01); *B60Q 1/50* (2013.01); *B60Q 5/00* (2013.01); *B60S 1/62* (2013.01); *H01Q 1/3275* (2013.01)

(58) Field of Classification Search
  USPC ......................................... 296/216.01–216.5
  See application file for complete search history.

(56) References Cited

U.S. PATENT DOCUMENTS

| | | |
|---|---|---|
| 2016/0297482 A1 | 10/2016 | Sakabe et al. |
| 2017/0369003 A1 | 12/2017 | Williams et al. |
| 2017/0369106 A1 | 12/2017 | Williams et al. |
| 2018/0037267 A1 | 2/2018 | Williams et al. |
| 2019/0003895 A1 | 1/2019 | Krishnan et al. |
| 2019/0202371 A1 | 7/2019 | Frederick et al. |
| 2019/0210436 A1 | 7/2019 | Frederick et al. |

FOREIGN PATENT DOCUMENTS

| | | |
|---|---|---|
| DE | 102016123752 A1 | 7/2017 |
| DE | 202017101968 U1 | 10/2017 |
| DE | 102018115498 A1 | 1/2019 |
| DE | 102018115502 A1 | 1/2019 |
| EP | 2860820 A1 | 4/2015 |
| JP | 2005-153719 A | 6/2005 |
| JP | 2016-199257 A | 12/2016 |
| JP | 2017007417 A | 1/2017 |
| JP | 2019038509 A | 3/2019 |

OTHER PUBLICATIONS

International Search Report for PCT/EP2019/083672 dated May 7, 2020, and English translation submitted herewith (6 pages).
Anonymous. "VW Cedric. The Future Car! Without Steering Wheel. Pedals and Cockpit—Autocarweek.com", autocarweek. Mar. 19, 2017 (Mar. 19, 2017). Retrieved from the Internet: https://autocarweek.com/vw-cedric/ [retrieved on Apr. 17, 2020] XP055686927.

* cited by examiner

ROOF MODULE WITH SENSOR SYSTEM FOR A MOTOR VEHICLE WHICH TRAVELS AUTONOMOUSLY OR PARTIALLY AUTONOMOUSLY, COMPRISING A ROOF OPENING SYSTEM AND/OR A FIXED ROOF ELEMENT

CROSS-REFERENCE TO RELATED APPLICATION

This application is a U.S. national phase application filed under 35 U.S.C. § 371 of International Application No. PCT/EP2019/083672, filed Dec. 4, 2019, designating the United States, which claims priority from German Patent Application Number DE 10 2019 122 193.5, filed Aug. 19, 2019, which is hereby incorporated herein by reference in its entirety for all purposes.

FIELD

The invention relates to a roof module for a motor vehicle, in particular for a passenger car, the roof module comprising the features of the preamble of claim 1.

BACKGROUND

A roof module of this kind is known from practice and is a vehicle roof, in particular of a passenger car, which can be placed on a vehicle body, which forms a vehicle frame, as a separate component. The roof module can be a purely solid roof which has a transparent portion forming a see-through portion for forming a panoramic roof. When the roof module is in the installed position, i.e., when the roof module is connected to the vehicle body or the vehicle frame, the solid roof is disposed in a fixed, i.e., immobile, manner relative to the vehicle body. Alternatively or additionally, the roof module can have a roof opening system which comprises a displaceable lid element by means of which a roof opening can be selectively opened or closed. Additionally, the roof module always comprises a roof skin, which forms an outer visible surface of the roof module and is partially transparent to form the see-through portion on the solid roof element and can extend up to the roof opening when the roof module has a roof opening system.

Furthermore, it is known for sensor modules allowing autonomous or semi-autonomous driving of the motor vehicle in question to be disposed on vehicle roofs. These sensor modules comprise environmental sensors by means of which a vehicle environment can be monitored and detected. So far, the sensor modules have been placed on top of the vehicle roof since the vehicle roof is typically the highest point of elevation of a vehicle, from which the vehicle environment is easily visible. However, the sensor modules configured for being placed on top lead to a vehicle appearance that typically does not satisfy customer demands.

SUMMARY

The object of the present invention is to provide a roof module for a motor vehicle, in particular a roof module for a passenger car, which is suitable for integrated use in an autonomously or semi-autonomously driving motor vehicle while satisfying high visual demands.

According to the invention, this object is attained by the roof module having the features of claim 1.

So according to the invention, a roof module is proposed which has a roof opening system comprising a lid element for selectively opening or closing a roof opening and/or a solid roof element comprising a transparent see-through portion and in which a sensor module comprising at least one environmental sensor is provided in an integrated manner; the environmental sensor does not shade or cover the roof opening or the transparent see-through portion and can be accommodated in the roof module in a visually appealing manner owing to the cover element, which is part of the roof skin.

The invention provides a sensor roof, also known as a roof sensor module (RSM), that allows the vehicle in question to drive autonomously or semi-autonomously and that is provided with a transparent solid roof portion and/or an openable roof portion. The design of the cover element in particular allows the roof skin to be adapted to customer demands in a visually appealing manner. In the autonomous driving mode, the vehicle in question drives autonomously at least without essential interference by a driver. In the semi-autonomous driving mode, the roof module according to the invention is part of a driver assistance system, for example.

In an integrated manner, the roof module configured according to the invention is a vehicle roof in which components required for autonomous or semi-autonomous driving of the vehicle are accommodated. The roof module, in which a plurality of functional elements are integrated, can be connected to a vehicle body or a vehicle frame as a compact structural unit by a vehicle manufacturer in order to form a vehicle roof. The roof module can in particular also comprise functional elements that are disposed in the area of a rear mirror in known motor vehicles and that limit the field of view for passengers of the vehicle in question.

The environmental sensor with which the roof module according to the invention is provided can basically be configured in many ways and can in particular comprise a LiDAR sensor, a radar sensor, an optical sensor, such as a camera, and/or the like. LiDAR sensors preferably operate in a wavelength range of 905 nm or also about 1550 nm. A camera used as an environmental sensor can operate in the wavelength range of visible light and/or in the infrared range.

The roof module according to the invention can in particular be employed in a passenger car, but it can also form or be part of a vehicle roof of a utility vehicle, such as a delivery van or a tractor unit.

The roof skin of the roof module according to the invention can be a single piece or composed of multiple pieces. The cover element, which covers the sensor module and at least part of the roof frame, can be an integral part of the roof skin or a separate roof skin element. It is also conceivable for the cover element to be a separate component which is connected to adjacent roof skin areas via locking means, screws and/or adhesives, for example. A weatherstrip between the cover element and the adjacent roof skin areas can prevent splash water and humidity from entering the roof module. If the roof skin is composed of multiple parts, the outer faces of the individual roof skin elements are advantageously flush with each other, with the result hat a harmonic outer roof face is formed.

The cover element or the roof skin preferably has a sensor see-through portion through which the environmental sensor detects the vehicle environment. The sensor see-through portion is advantageously transparent to the wavelengths used by the environ-mental sensor. In particular, the sensor see-through portion is configured in such a manner that signals of the environmental sensor, which are in a wavelength range between 300 nm and 2000 nm, can pass through it.

In a preferred embodiment of the roof module according to the invention, the cover element, which covers at least a portion of the sensor module, has a curvature that corresponds to the curvature of conventional vehicle roofs. For example, the cover element has a curvature having a curvature radius between 1000 mm and 10,000 mm, in particular between 2000 mm and 5000 mm, in the transverse roof direction and/or the longitudinal roof direction. Accordingly, the curvature of the cover element can change across the extension in the transverse roof direction and/or the longitudinal roof direction.

In a preferred embodiment, the cover element is a lightweight element, which preferably comprises or is a plastic composite component and/or an injection-molded plastic component, in order to keep the total weight of the roof module according to the invention low. For example, the cover element comprises a honeycomb structure bordered by fiber-reinforced polyurethane layers. If the cover element is an injection-molded plastic component, it can be made of a polycarbonate material or another suitable plastic.

The roof frame of the roof module according to the invention, which is configured to be installed on the vehicle body and comprises at least one transverse frame part and two longitudinal frame parts extending in the longitudinal roof direction, can be designed as a support for the sensor module. To this end, the transverse frame part can be a front frame part on which the environmental sensor is disposed. In this case, the cover element is preferably a front cover which covers the front frame part across its entire width and can be a single part or composed of multiple parts. In this case, the cover element is part of a front header of the vehicle in question, which forms an upper frame leg of a windshield frame extending in the transverse vehicle direction.

However, the transverse frame part can also be a rear frame part on which the environmental sensor is disposed, in which case the cover element is a rear cover which is composed of a single piece or of multiple pieces and which can cover the rear frame part across its entire width in the transverse roof direction and which can be composed of a single piece or of multiple pieces.

In order for the roof module according to the invention to be flat in the area of the sensor modules, the roof frame can have a lowered accommodating portion, on which the sensor module is installed, in each of these areas.

The sensor module can have a support sheet via which it is installed on the roof frame. The support sheet preferably serves to accommodate and attach multiple environmental sensors, which are used to detect the vehicle environment, and/or other functional elements of the sensor system, such as a heating device and/or a cooling device for the environmental sensor, a cleaning device, electrical lines, fluid lines and/or the like.

In order to be able to also detect the lateral environment of the motor vehicle in question in a sufficient manner, at least one sensor, i.e., an environmental sensor, of the sensor system can be disposed on each of the longitudinal frame parts of the frame.

In order to be able to use the roof module according to the invention under as many conditions as possible, a heating device, a cooling device and/or a cleaning device for the sensor module can be provided. The heating device and the cooling device and the cleaning device can each be disposed on the roof frame or be an integrated part of the sensor module itself. The heating device and the cooling device ensure that the sensor module and the environmental sensor can always be kept in a temperature range in which its ideal functioning is ensured. The cooling device can also dissipate heat that is generated by the environmental sensor itself and that might affect the operation of the environmental sensor. So the roof module according to the invention can feature thermal management for the sensor module.

The cleaning assembly is in particular configured in such a manner that a sensor see-through portion of the cover element, through which the environmental sensor detects the vehicle environment, can be kept clean and can use a cleaning liquid or a gas as a cleaning fluid. For example, the cleaning assembly comprises a fluid nozzle by means of which a cleaning fluid in the form of a gas or a liquid is applied as a function of the amount of dirt on the sensor see-through portion or at certain time intervals.

The cleaning assembly can be coupled with a device for detecting the amount of dirt on the sensor see-through portion. This detection device can comprise optical devices or devices that determine the amount of dirt based on the vibration behavior of the sensor see-through portion, for example.

Additionally, it is advantageous if the sensor see-through portion itself has a heating device, by means of which fogging or icing of the sensor see-through portion can be prevented, in addition to the cleaning assembly.

If the roof module according to the invention is provided with a cleaning device and a cooling device that works with a coolant, the coolant can be formed by a cleaning liquid used by the cleaning device and stored in a tank of the vehicle in question. The tank can be formed in the roof module.

In order to ensure that the sensor module employed in a roof module having a roof opening system can also be used when a roof opening is open, the lid element is advantageously located outside of a detection area or a signal cone of the sensor module when it is in its open position.

The solid roof element, which forms the transparent see-through portion located above a vehicle interior, preferably covers the roof frame with its edge portions while also forming the cover element for the sensor module.

In an advantageous embodiment of the roof module according to the invention, at least one signal light is integrated by means of which an operating mode or an activation state of the sensor system and thus of the vehicle in question can be indicated. The signal light can be disposed at the rear or at the front of the roof module and can be covered by the roof skin or the cover element, which is part of the roof skin, at the top. In particular, the signal light is what is known as an ADS (autonomous drive signal) light, which indicates whether the vehicle in question is in an autonomous driving mode.

Other means of communication that allow the vehicle to communicate with other road users can also be integrated in the roof module according to the invention. For example, the roof module has an acoustic signaling device which communicates with the vehicle environment, i.e., with other road users, and can also provide information on an activation state of the sensor system.

In order to provide protection against environmental conditions and damage in an inactive state, in which the sensor system or the sensor module is not in use, the cover element can be displaceable relative to other roof skin areas. In particular, it is conceivable for the cover element to be displaceable in such a manner that the sensor module can be retracted into an interior of the roof module when it is not in use.

The roof module according to the invention preferably comprises at least four sensor modules, which are each disposed in a corner portion of the roof module and thus able to detect at least almost the entire vehicle environment. Additionally or alternatively, an environmental sensor, which is formed by a camera, for example, can be disposed in the center front area or in the center rear area of the roof module. The camera can comprise or be a mono/multi/multi-focal and/or stereo camera. It is also conceivable for an environmental sensor to be disposed on a lateral longitudinal frame beam of the roof frame.

The distance between the sensor modules disposed in the corner portions of the roof module depends on the type of vehicle in question. If it is a conventional sedan, the distance is preferably 80 cm to 150 cm in the longitudinal roof direction. If it is a station wagon, the distance of the sensor modules disposed in the corner portions is preferably about 100 cm to 300 cm in the longitudinal roof direction. If it is a small vehicle, the distance between the sensor modules disposed in the corner portions can be between 40 cm and 120 cm in the longitudinal roof direction. The distance in the transverse roof direction can be between 60 cm and 140 cm in each case. For example, the ratio of the distance between the sensor modules disposed in the corner portions in the transverse vehicle direction to the distance between the sensor modules disposed in the corner portions in the longitudinal vehicle direction is in the range between 1:1 and 1:5. In the case of a utility vehicle, this ratio can also be between 1:5 and 1:10.

The environmental sensors or the sensor modules of the roof module according to the invention are preferably disposed behind a step of the roof skin formed by the cover element. A front face of the step forms the sensor see-through portion for the environmental sensor. The step of the cover element preferably has a height of a few centimeters, in particular a height of about 3 cm to 15 cm. The sensor module can also be located behind a steeply sloping roof line formed by the cover element or a bump-shaped elevation formed by the cover element.

The sensor module preferably has a structural height of no more than 50 cm, preferably no more than 40 cm and in particular no more than 30 cm.

The roof skin of the roof module according to the invention preferably also forms non-see-through portions, below which functional elements of the sensor system can be disposed. The functional elements preferably comprise electrical lines, fluid lines and/or mechanical modules required for the sensor system. Guide rails, which are typically part of a roof opening system, can also be covered by non-transparent portions of the roof skin.

The roof frame of the roof module according to the invention, which can be a support integrated in the roof module, preferably forms an interface via which the roof module can be connected to the vehicle body or the vehicle frame.

Furthermore, the roof module according to the invention can have an interface via which the sensor module of the roof module can communicate with other sensor elements of the vehicle in question, which are disposed in the area of a bumper, for example, and which are required for autonomous driving of the vehicle.

The roof module according to the invention can further comprise at least one antenna module and a radio modem. The antenna module can be configured to receive radio signals, mobile radio signals, GPS signals and the like and be configured in the manner of DSRC patch antennas. The antenna modules can in particular serve for car-to-car communication or for communication of the vehicle in question with other road users. The antenna module can be an insert of an injection-molded plastic portion of the roof module, such as an insert of the roof skin.

The roof module according to the invention can be part of a roof module selection which has a similar mechanical interface to a vehicle frame and from which a vehicle manufacturer can choose according to customer demands.

Other advantages and advantageous configurations of the subject matter of the invention are apparent from the description, the drawing, and the claims.

Examples of embodiments of a roof module according to the invention are illustrated in a schematically simplified manner in the drawing and will be discussed in more detail in the following description.

DETAILED DESCRIPTION

Figure 1:
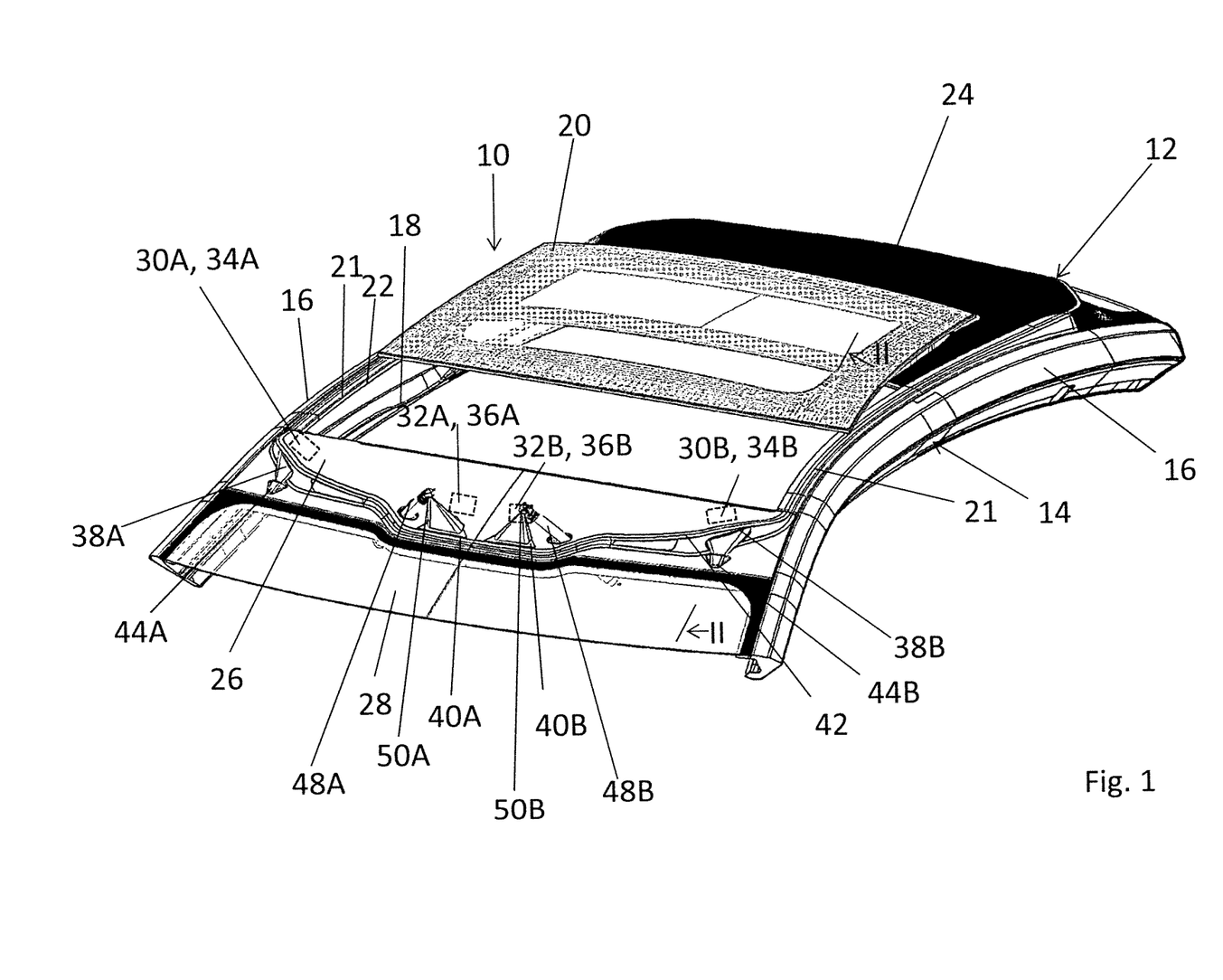
FIG. 1 is a perspective view of a vehicle roof comprising a roof module according to the invention.

FIG. 1 shows a vehicle roof 10 of a motor vehicle, which is configured as a passenger car and has a roof module 12, which is placed on a vehicle frame, which comprises inter alia a roof side beam 16 on either side of a vertical longitudinal center vehicle plane.

Roof module 12 is a roof sensor module (RSM) which is equipped with devices enabling the motor vehicle in question to drive autonomously.

Figure 2:
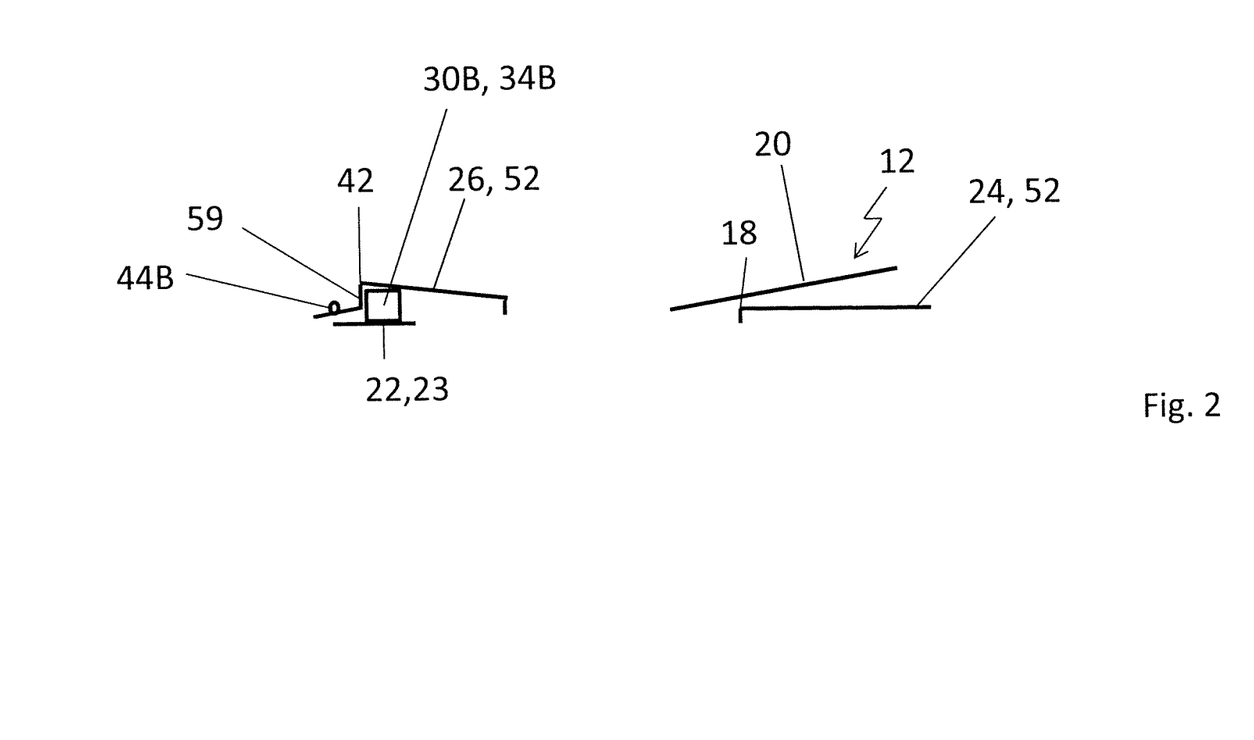
FIG. 2 is a schematic section through the roof module of FIG. 1 along line II-II.

As can be seen in FIG. 1, roof module 12 comprises a roof opening 18, which can be selectively opened or closed by means of a lid element 20, which can be displaced in the longitudinal vehicle direction. For this purpose, lid element 20 is mounted in a guide rail 21 on either side, each guide rail 21 being part of a roof frame 22, which is a support structure of roof module 12 and has a transverse roof beam 23, which forms a front frame part, as can be seen in FIG. 2. Guide rails 21 are each part of longitudinal roof beams of roof frame 22.

To the rear of roof opening 18, roof module 12 comprises a roof skin portion 24, which forms a solid roof element.

Forward of roof opening 18, roof module 12 comprises a roof skin portion 26, which is a cover element and forms a front header of the motor vehicle in question, said front header extending in the transverse roof direction and being an upper transverse leg of a frame of a windshield 28.

Roof module 12 is provided with a sensor system allowing the vehicle in question to drive autonomously and having multiple sensor modules 30A, 30B, 32A and 32B, which are disposed below roof skin portion 26 and each comprise an environmental sensor 34A, 34B, 36A and 36B, respectively. Environmental sensors 34A and 34B are each configured as what is known as a LiDAR sensor, which operates at a wavelength of 905 nm and/or 1550 nm. The two environmental sensors 36A and 36B are each a camera, which can be configured as a mono/multi/multi-focal and/or stereo camera. The cameras of environmental sensors 36A and 36B operate in the wavelength range of visible light and in the near infrared range.

Roof skin portion 26, which forms the cover element, has see-through portions 38A, 38B, 40A and 40B in the area of sensor modules 30A, 30B, 32A and 32B, respectively, each of see-through portions 38A, 38B, 40A and 40B being transparent for wavelengths between 200 nm and 2000 nm, in particular for the wavelengths used by environmental sensors 34A, 34B, 36A and 36B. Additionally, see-through portions 38A, 38B, 40A, and 40B can also each be transparent to radar radiation.

The cover element formed by roof skin portion 26 is made of plastic and is in particular a polycarbonate injection-molded plastic part or a lightweight composite component.

Front roof skin portion 26 forms a step 42, which is mirror-symmetrical with respect to the longitudinal center vehicle plane and which is curved in the rear direction from the longitudinal center vehicle plane. See-through portions 38A and 38B are disposed on a front face of step 42 in respective front edge portions of roof module 12. See-through portions 40A and 40B are formed on the upper side of roof skin portion 26 close to the longitudinal center vehicle plane and are symmetrical to each other.

In order to be able to keep see-through portions 38A, 38B, 40A and 40B clean, the roof module has fluid nozzles 44A, 44B, 50A and 50B. Fluid nozzles 50A and 50B are disposed on deployable nozzle rods. Fluid nozzles 44A and 44B are fixed to roof skin 26 forward of step 42. Fluid nozzles 44A, 44B, 50A and 50B each use a cleaning fluid, which is supplied via suitable lines and which can be a liquid or a gas, to produce a fluid cone or a spray cone, which strikes the respective see-through portion if needed and cleans it and also dries it if gas or air is used.

In a specific embodiment, fluid nozzles 44A, 44B, 50A and 50B each operate as a function of the amount of dirt on see-through portions 38A, 38B, 40A and 40B. The amount of dirt can be determined by means of a detection device, which works optically or assesses the vibration behavior and interprets a change in the vibration behavior of see-through portions 38A, 38B, 40A and 40B as a change in the amount of dirt.

Sensor modules 30A, 30B, 32A and 32B are located outside of the area occupied by roof opening 18.

Figure 3:
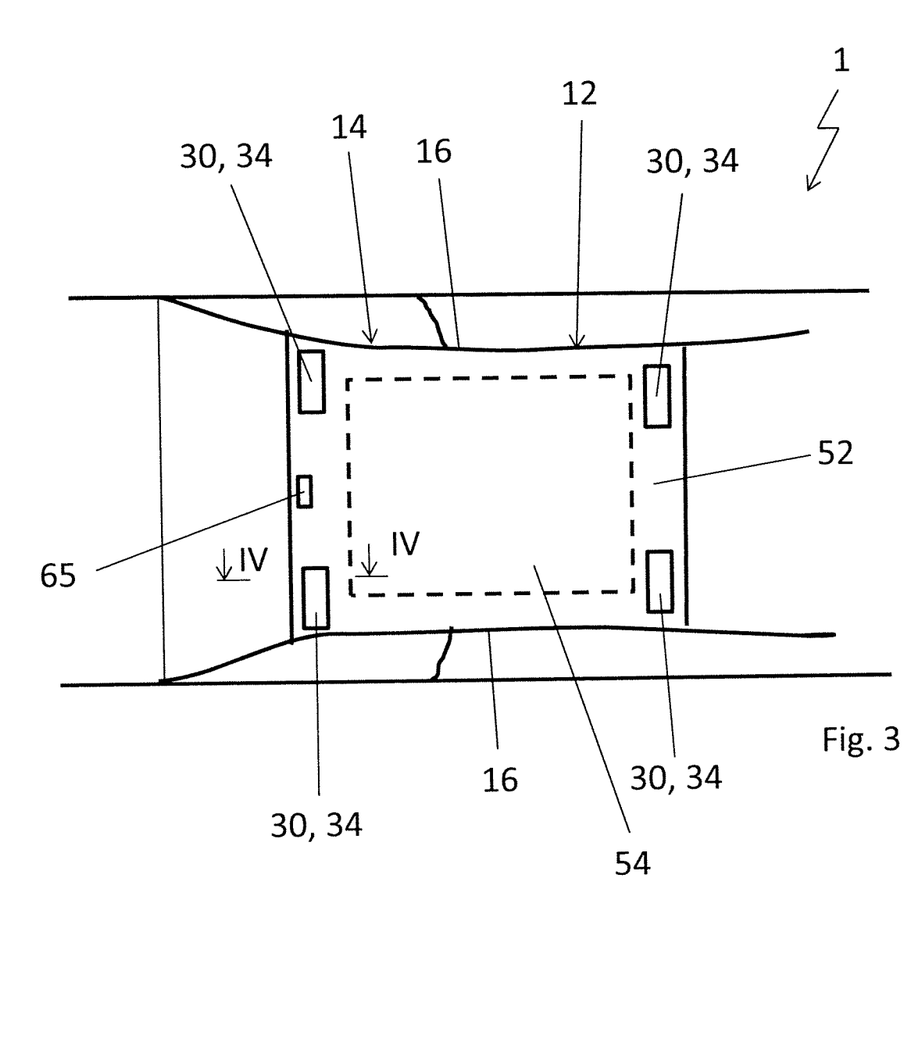
FIG. 3 is a schematic top view of another vehicle roof comprising a roof module according to the invention.
Figure 4:
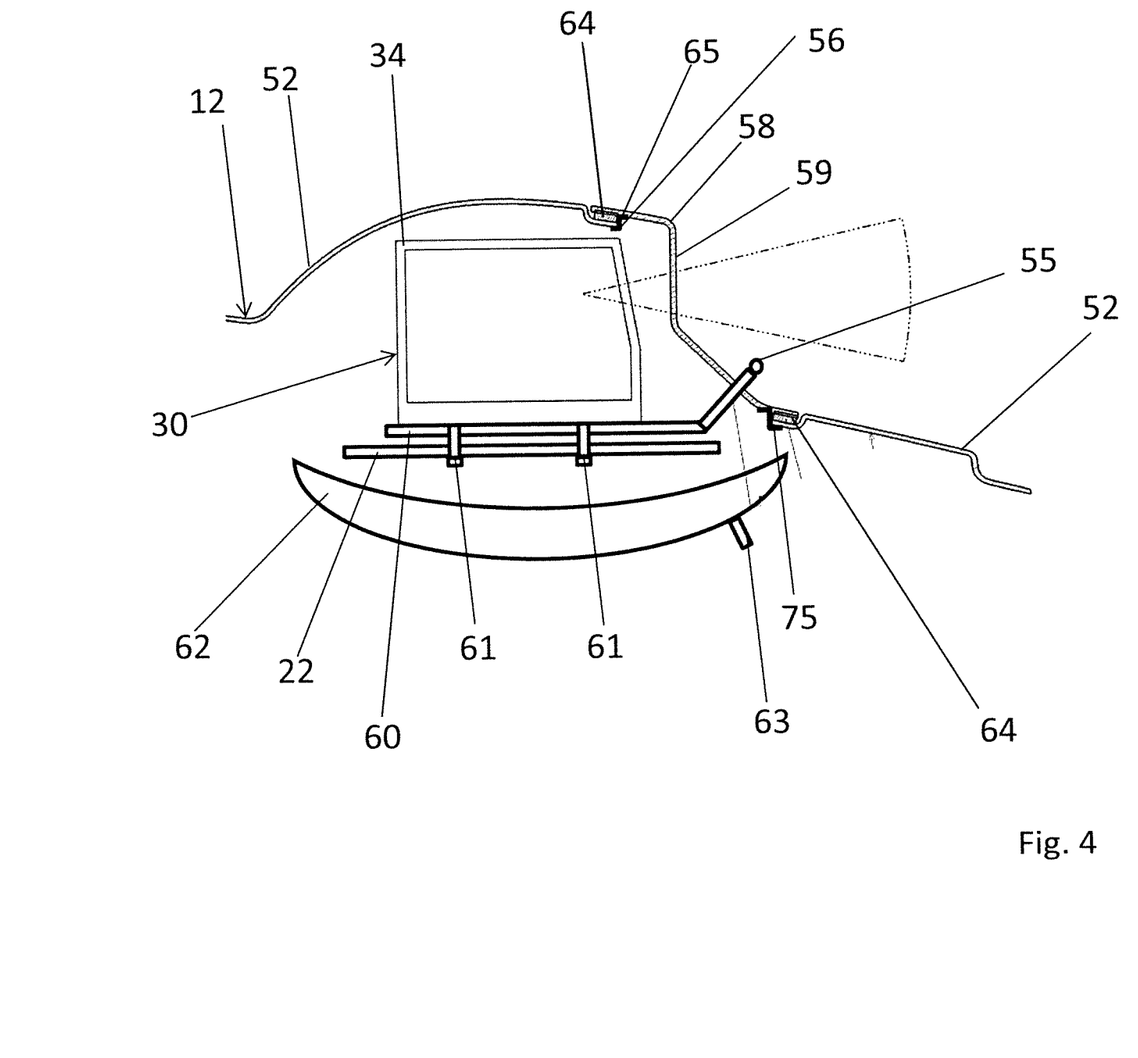
FIG. 4 is a schematic section through the vehicle roof of FIG. 3 along line IV-IV.

FIGS. 3 and 4 show sections of a motor vehicle 1, which is also configured as a passenger car and has a vehicle body 14, which is a vehicle frame and on which a roof module 12 is placed. Roof module 12 forms a vehicle roof which is limited by lateral longitudinal beams 16, which are part of vehicle body 14.

Roof module 12 comprises a roof skin 52, which forms a transparent roof portion 54 in a central area, through which light can enter a vehicle interior. Roof skin 52 is attached to a circumferential roof frame 22, which forms a support structure of roof module 12 and an interface of roof module 12 to the vehicle body.

Like the roof module according to FIGS. 1 and 2, roof module 12 is a roof sensor module (RSM) provided with devices allowing the motor vehicle in question to drive autonomously. To this end, roof module 12 has a sensor module 30 in each of its four corner portions, each sensor module 30 being provided with at least one environmental sensor 34, by means of which the vehicle environment can be detected in order to implement autonomous driving. By evaluating the measuring signals of environmental sensors 34 by means of a controller of the motor vehicle, a current traffic situation can thus be determined, allowing the motor vehicle to autonomously adapt to the current traffic situation and to behave accordingly. Sensor modules 30 are each disposed on roof frame 22 and are largely covered by roof skin 52, which forms a cover element.

As in the embodiment according to FIGS. 1 and 2, environmental sensors 34 can be configured in various ways and comprise a LiDAR sensor, a radar sensor, a camera, and/or another suitable sensor, for example.

In the embodiment illustrated in FIGS. 3 and 4, roof skin 52 is essentially continuous. In the area of each of sensor modules 30, roof skin 52 has an opening 56, which is closed by a maintenance cover 58, which is fixed in a detachable manner. Maintenance cover 58 forms a see-through portion 59, which is transparent to the wavelength range used by respective environmental sensor 34. In particular, see-through portion 59 is transparent to wavelengths between 200 nm and 2000 nm. A transparency to radar radiation may be required, as well. A LiDAR sensor, which can be utilized as an environmental sensor, uses a wavelength of 905 nm and/or a wavelength of 1550 nm, for example.

As shown in FIG. 4, environmental sensors 34 are each disposed on a support plate 60, which is screwed to roof frame 22 by means of screws 61 or is a part thereof. Furthermore, cleaning nozzles or fluid nozzles 54 are attached to support plates 60, fluid nozzles 54 penetrating maintenance cover 58 and serving to clean the outside of maintenance cover 58 in see-through portion 59 for environmental sensor 34. In order to supply cleaning nozzles 44 with cleaning fluid, supply hoses (not shown) or the like are provided, which can be attached to support plate 60 and/or roof frame 22.

A drip pan 62, by means of which potentially entering splash water or the like can be collected and discharged via a line 63, is disposed below roof frame 22 and below sensor module 30.

Maintenance cover 58 rests on roof skin 52 via a circumferential weatherstrip 64. Additionally, maintenance cover 58 is fixed to roof skin 52 in a detachable manner via locking hooks 65.

Sensor modules 24, which are disposed on roof frame 22, are located outside of roof see-through portion 54 and are covered by roof skin 52, which forms a cover element. The cover element formed by the roof skin additionally covers roof frame 22 in areas located next to sensor modules 24.

Figure 5:
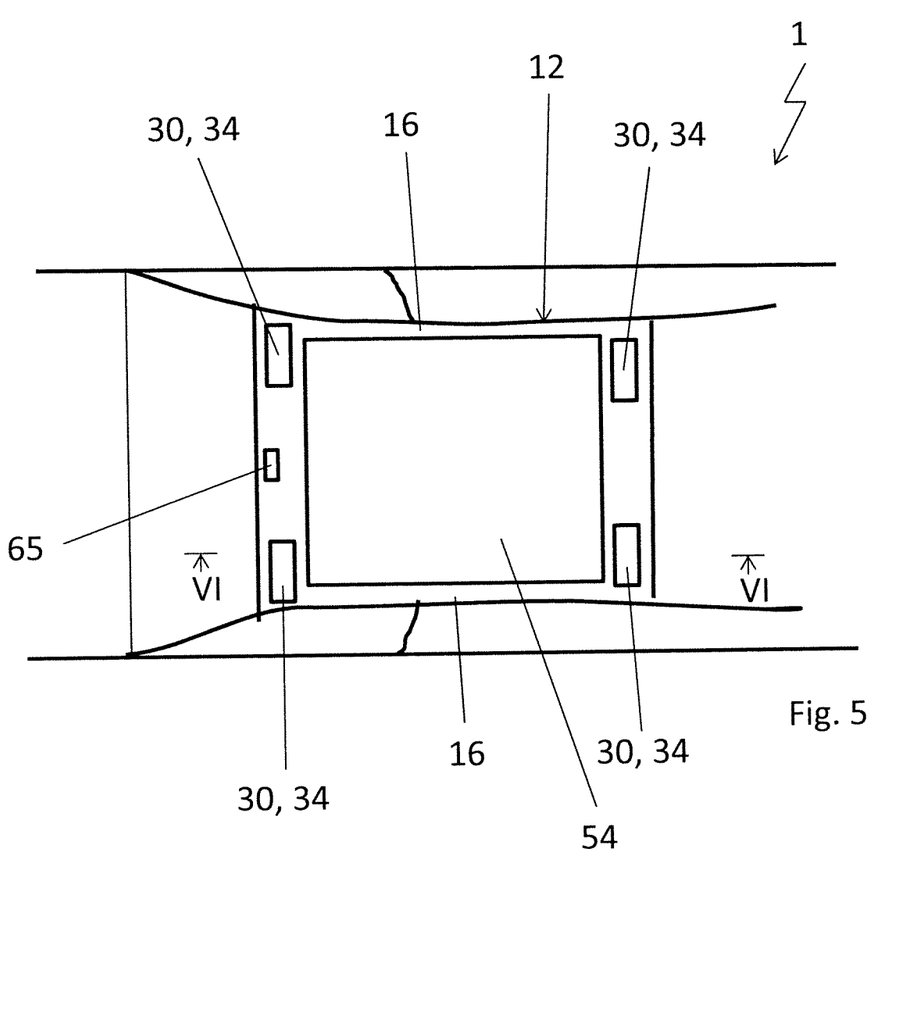
FIG. 5 is a top view of a motor vehicle comprising another embodiment of a roof module according to the invention.
Figure 6:
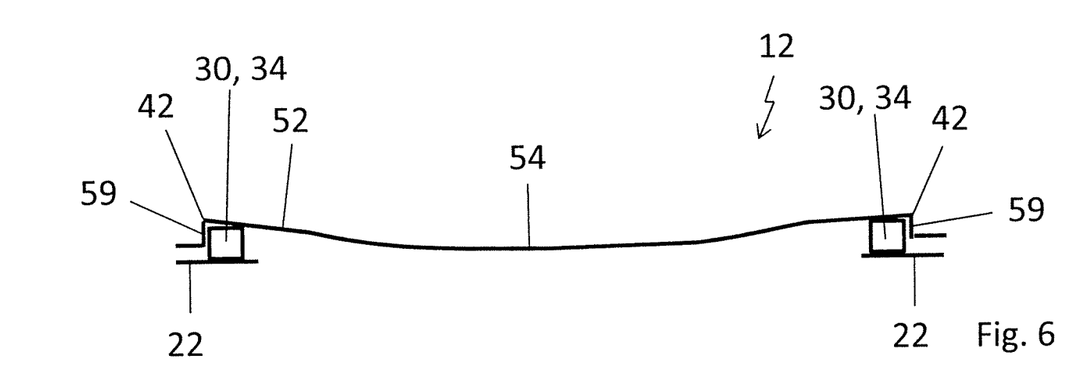
FIG. 6 is a section through the roof module of FIG. 5 along line VI-VI in FIG. 5.

FIGS. 5 and 6 show a vehicle roof which is formed by a roof module 12, which is also bordered by lateral roof side beams 16, which are part of a vehicle body.

Roof module 12, which is illustrated on its own in FIG. 6, is a roof sensor module (RSM), which is equipped with devices enabling the motor vehicle to drive autonomously.

Like the embodiments described above, roof module 12 according to FIGS. 5 and 6 comprises a roof frame 22, which forms a support structure and is an interface of roof module 12 to the vehicle body. Additionally, roof module 12 comprises a roof skin 52, which forms a transparent see-through portion 54 in a central area, through which light can enter a vehicle interior. Roof skin 52 is fixed to roof frame 22.

Roof module 12 has a sensor module 30 in each of its four corner portions, each sensor module 30 being provided with an environmental sensor 34, by means of which the vehicle environment can be detected in order to implement autonomous driving of the motor vehicle. Sensor modules 30 are each disposed on roof frame 22. Environmental sensors 34 of sensor modules 30 can each be configured according to the embodiments described above.

Roof skin 52, which forms transparent solid roof portion 54, extends into the corner portions of the roof module, which means that sensor modules 30 are covered by roof skin 54. In the case at hand, roof skin 54 is composed of a single piece. However, it is also conceivable for roof skin 54 to be composed of multiple roof skin elements.

In order to enable environmental sensors 34 of sensor modules 30 to monitor the vehicle environment, roof skin 54 forms a step 42 in the area of each of sensor modules 24, a see-through portion 59 being formed on the front face of each step 42. A slight bump or a steeply sloping roof line may also be formed instead of the step. See-through portions 59 are transparent to the wavelength ranges used by environmental sensors 34.

Since sensor modules 30 are disposed in the corner portions, they are spaced far apart from each other and disposed outside of see-through portion 54, which is formed by the transparent solid roof portion. As in the embodiments described above, sensor modules 30 have a distance from each other that is at least about 70 cm to 100 cm in the transverse roof direction and at least about 120 cm to 180 cm in the longitudinal roof direction in the configuration shown.

In addition, roof module 12 has what is known as an ADS light 65, which can inform the vehicle environment as to whether motor vehicle 10 is in an autonomous driving mode, in the middle of a front area relative to a vertical longitudinal roof plane.

Figure 7:
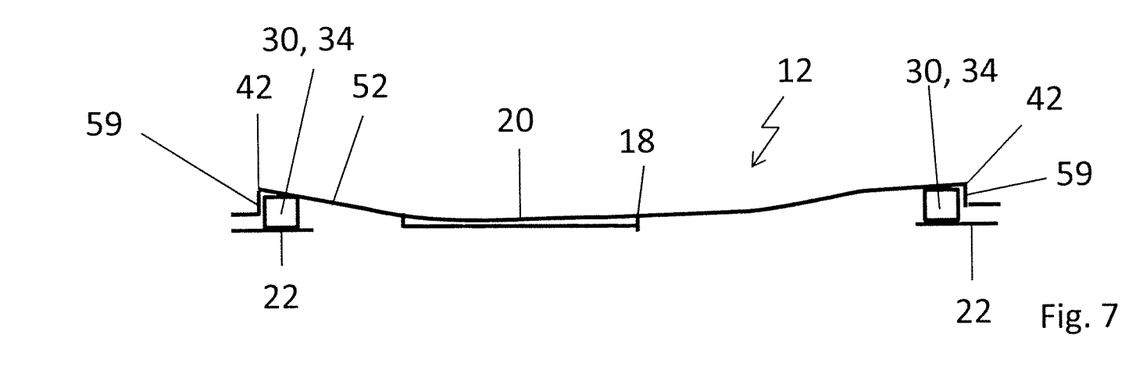
FIG. 7 is a longitudinal section corresponding to FIG. 6 through another embodiment of a roof module.
Figure 8:
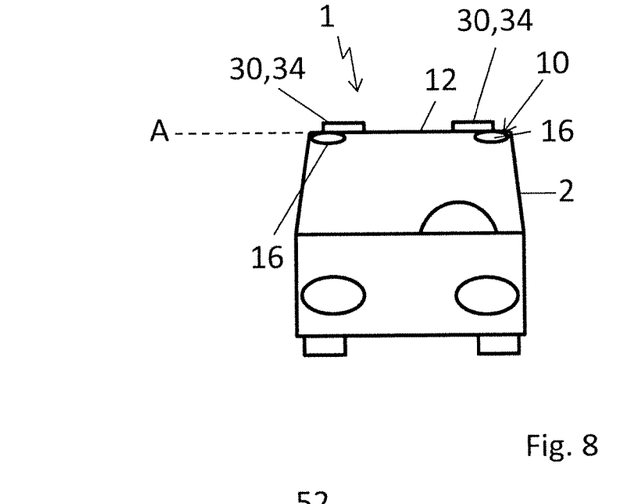
FIG. 8 is a front view of a vehicle comprising a roof module according to the invention.
Figure 9:
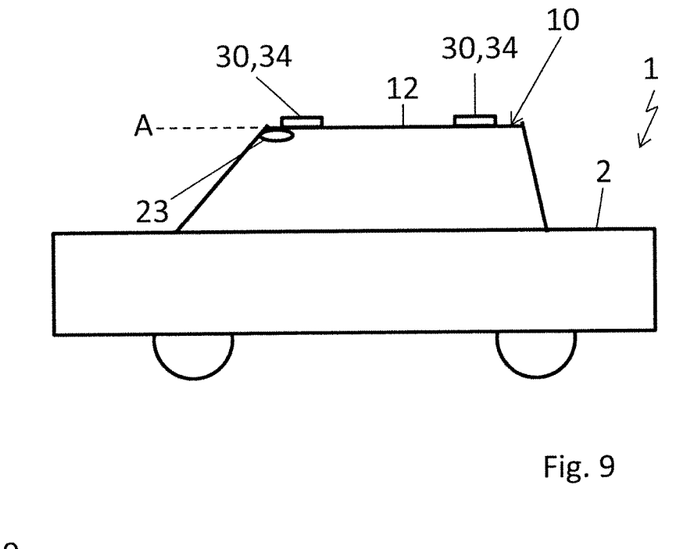
FIG. 9 is a side view of the vehicle of FIG. 8.

FIG. 7 shows another embodiment, which forms a roof module 12, which differs from the roof module illustrated in FIGS. 5 and 6 in that it forms a roof opening 18, which can be selectively closed or at least partially opened by means of a lid element 20, which is part of a roof opening system. Roof opening 18 is surrounded by a roof skin 52, which, like in the embodiment according to FIGS. 5 and 6, covers sensor modules 30 in the corner portions of the roof module, sensor modules 30 each comprising an environmental sensor 34 and being disposed on a roof frame 22, which is part of roof module 12 and forms an interface to a vehicle body.

Lid element 20 is a lid element of a spoiler roof and is disposed above rear sensor modules 30 and outside of their field of view when in its fully open position. The field of view of environmental sensors 34 of said sensor modules 30 is not shaded in said open position of lid element 20 either.

Otherwise, the roof module according to FIG. 7 is configured in the same way as the roof module according to FIGS. 5 and 6, which is why it is not described in further detail for the sake of concision.

FIGS. 8 to 11 show a motor vehicle 1, which is configured as a passenger car and has a vehicle body 2, which is a vehicle frame structure and on which a vehicle roof 10 is disposed. Vehicle roof 10 comprises a roof module 12, which is configured as what is known as a roof sensor module (RSM) and thus provided with a sensor system enabling motor vehicle 1 to drive autonomously.

Figure 10:
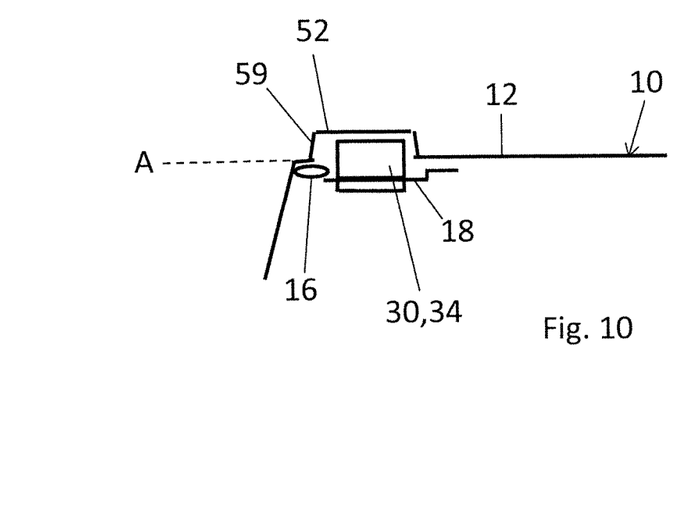
FIG. 10 is a section through the roof of the vehicle of FIG. 8 in the area of a roof side beam.
Figure 11:
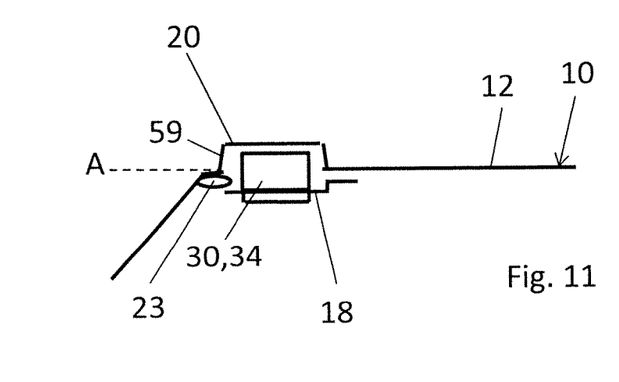
FIG. 11 is a section through the roof of the vehicle of FIG. 8 in the area of a front header.

Roof module 12, which is illustrated in FIGS. 10 and 11 in particular, comprises a support structure, which forms a roof frame 22, and a partially transparent roof skin 52, which is a solid roof element and forms an outer roof skin.

Furthermore, roof module 12 is provided with a sensor module 30 in each of its four corner portions, each sensor module 30 comprising an environmental sensor 34, by means of which the vehicle environment can be detected in order to implement autonomous driving of motor vehicle 1. Sensor modules 30 and environmental sensors 34 are configured in the same way as the sensor modules and the environmental sensors of the embodiment described above and are disposed outside of a central roof see-through portion located above a vehicle interior.

In the area of each of sensor modules 30, roof skin 52 forms a bump, each bump being predefined by the structural height of sensor modules 30 and being no higher than 12.5 cm. The structural height of sensor modules 30 is chosen in such a manner that an upper boundary surface is not spaced apart further than about 12.5 cm from a roof baseline A. Roof baseline A is a line that corresponds to a roof line of a vehicle roof without sensor modules, i.e., a vehicle roof that does not have any bumps in the roof skin that result from sensor modules.

Figure 12:
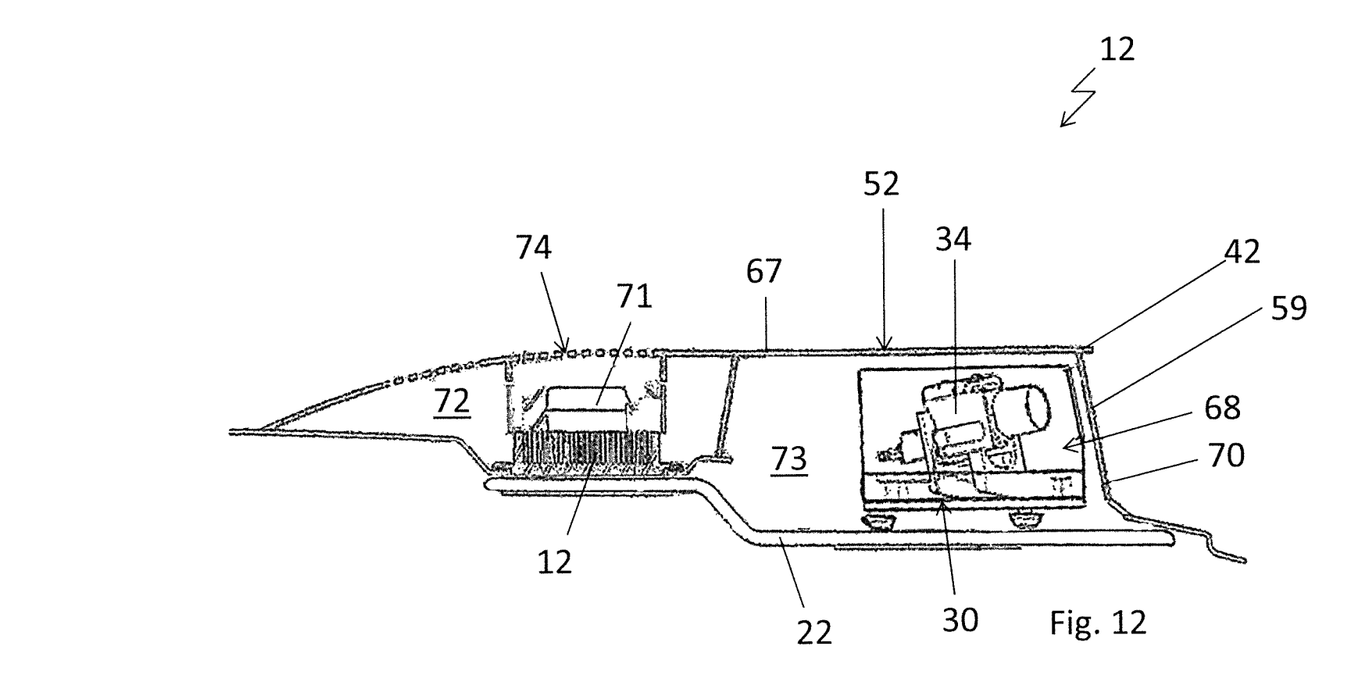
FIG. 12 is a schematic section through a roof module comprising a support module for attaching multiple environmental sensors.
Figure 13:
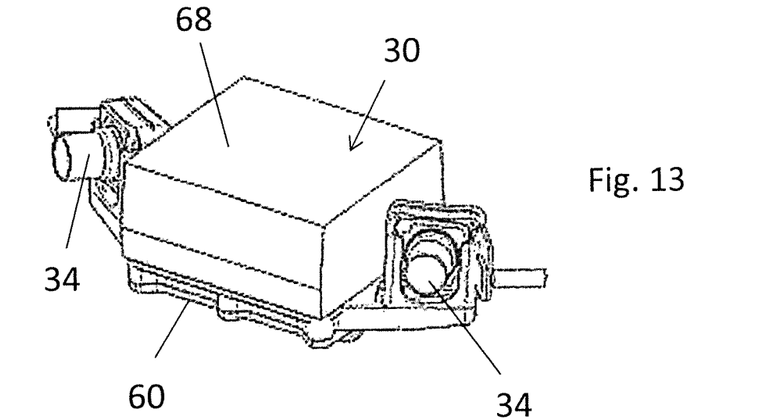
FIG. 13 is a perspective view of the support module of FIG. 12.
Figure 14:
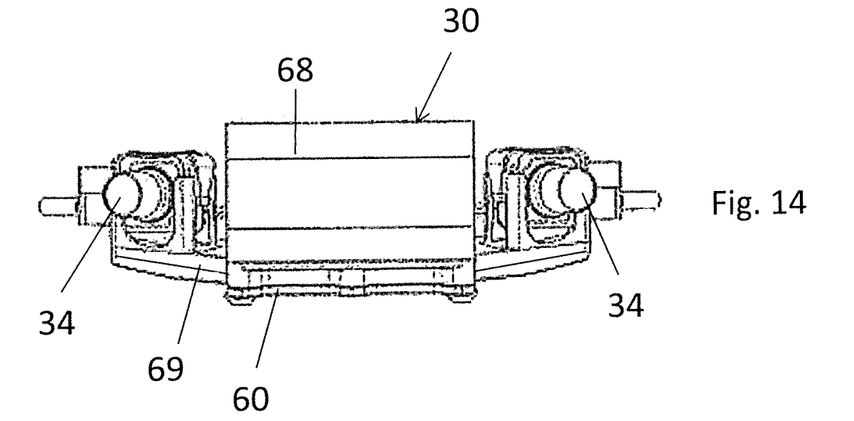
FIG. 14 is a top view of a vehicle roof comprising a roof module according to the invention, which has four sensor modules.

FIGS. 12 to 14 show sections of a roof module 12 for forming a vehicle roof. Roof module 12 comprises a panel component 67, which is part of a roof skin 52. As in the embodiment according to FIGS. 3 and 4, panel component 67 of roof skin 52 covers a sensor module 34, which comprises multiple environmental sensors 36. Environmental sensors 36 are disposed on a common support plate 60, on which a cooling device 68 is also disposed. In addition to environmental sensors 36, which may be configured in the same way as the environmental sensors of the embodiment described above, sensor module 34 has a heating device in the form of a heating plate 69, which is disposed between support plate 60 and environmental sensors 36 and by means of which environmental sensors 36 can be kept at an intended operating temperature.

Cooling device 68 comprises a liquid cooling element, which absorbs and dissipates waste heat produced by environmental sensors 36.

Roof skin 52 forms a step 42, on whose front face a see-through portion 59 for environmental sensors 34 is formed. See-through portion 59 is formed by a window insert 70.

Additionally, the roof module according to FIG. 12 comprises a cooling fan 71, which is disposed on a cooling element and associated with cooling device 68 and located in a wet area 72, whereas sensor module 30 is disposed in a dry area 73. In wet area 72, panel component 67 of roof skin 52 has recesses or holes 74 for the cooling fan.

REFERENCE SIGNS

1 motor vehicle
2 vehicle body
10 vehicle roof
12 roof module
14 vehicle frame
16 roof side beam
18 roof opening 20 lid element
21 guide rail
22 roof frame
23 transverse roof beam
24 roof skin portion
26 roof skin portion
28 windshield
30, 30A, 30B sensor module
32, 32A, 32B sensor module
34, 34A, 34B environmental sensor
36, 36A, 36B environmental sensor
38A, 38B see-through portion
40A, 40B see-through portion
41 step
44A, 44B fluid nozzle
48A, 48B cleaning device
50A, 50B fluid nozzle
52 roof skin
54 see-through portion
56 opening
58 maintenance cover
59 see-through portion
60 support plate
61 screw
62 drip pan
63 line
64 weatherstrip
65 ADS light
67 panel component
68 cooling device
69 heating plate
70 window insert
71 cooling fan
72 wet area
73 dry area
74 holes

The invention claimed is:

1. A roof module for a motor vehicle, the roof module comprising:
 a roof skin,
 a roof frame configured to be installed on a vehicle body and comprising at least one transverse frame part extending in the transverse roof direction and a longitudinal frame part extending in the longitudinal roof direction on either side of a longitudinal center roof plane, and
 the roof skin comprising a transparent see-through portion configured to allow light to enter a vehicle passenger compartment and being rigidly connected to the roof frame having a sensor system comprising at least one sensor module which has at least one environmental sensor and is located outside of the transparent see-through portion and is covered by a cover element which is a portion of the roof skin and covers at least a portion of the roof frame.

2. The roof module according to claim 1, wherein the cover element has a sensor see-through portion through which the environmental sensor detects the vehicle environment.

3. The roof module according to claim 1, wherein the cover element has a curvature having a curvature radius between 1000 mm and 10,000 mm, in particular between 2000 mm and 5000 mm, at least in the transverse roof direction and/or the longitudinal roof direction.

4. The roof module according to claim 3, wherein the curvature of the cover element changes in the transverse roof direction and/or the longitudinal roof direction.

5. The roof module according to claim 1, wherein the cover element is a lightweight element and preferably comprises a plastic composite component and/or an injection-molded plastic component.

6. The roof module according to claim 1, wherein the transverse frame part is a front frame part and the environmental sensor is disposed on the front frame part, and the cover element is a front cover covering the front frame part across its entire width in the transverse roof direction.

7. The roof module according to claim 1, wherein the transverse frame part is a rear frame part and the environmental sensor is disposed on the rear frame part, and the cover element is a rear cover covering the rear frame part across its entire width in the transverse roof direction.

8. The roof module according to claim 1, wherein at least one sensor of the sensor system is disposed on each of the longitudinal frame parts.

9. The roof module according to claim 1, wherein a heating, cooling and/or cleaning assembly for the sensor module is provided.

10. The roof module according to claim 1, wherein the solid roof element covers the roof frame with its edge portions and forms the cover element for the sensor module.

11. The roof module according to claim 1, wherein the cover element covers a signal light indicating an activation state of the sensor system.

12. The roof module according to claim 1, wherein an acoustic signaling device communicating with a vehicle environment and/or indicating an activation state of the sensor system is provided.

13. The roof module according to claim 1, wherein at least four sensor modules are provided, each sensor module being disposed in a corner portion of the roof module.

14. A vehicle comprising a vehicle body and a roof module according to claim 1.

15. The roof module according to claim 10, wherein the solid roof element forms the see-through portion located above the vehicle passemger compartment.

16. A roof module for a motor vehicle, the roof module comprising:
 a roof skin,
 a roof frame configured to be installed on a vehicle body and comprising at least one transverse frame part extending in the transverse roof direction and a longitudinal frame part extending in the longitudinal roof direction on either side of a longitudinal center roof plane, and
 a roof opening system to open a roof opening leading to a vehicle passenger compartment comprising a lid element configured to be displaced on guide rails, which are part of the longitudinal frame parts of the roof frame, relative to the roof frane in the longitudinal roof direction in order to selectively open or close a roof opening,
 having a sensor system comprising at least one senor module which has a least one environmental sensor and is located outside of the roof opening and is covered by a cover element which is part of the roof skin and covers at least part of the roof frame.

17. The roof module according to claim 16, wherein the lid element is located outside of a detection area of the sensor module when it is in its open position.

* * * * *